3,345,863
METHOD AND APPARATUS FOR DETERMINING THE MARBLING IN THE MUSCLE OF A LIVE ANIMAL BY ULTRASONICS
Elliott A. Henry, Newtown, and Henry G. Biagini, Stamford, Conn., assignors, by mesne assignments, to Branson Instruments Incorporated, Stamford, Conn., a corporation of Delaware
Filed Oct. 28, 1964, Ser. No. 407,106
7 Claims. (Cl. 73—67.5)

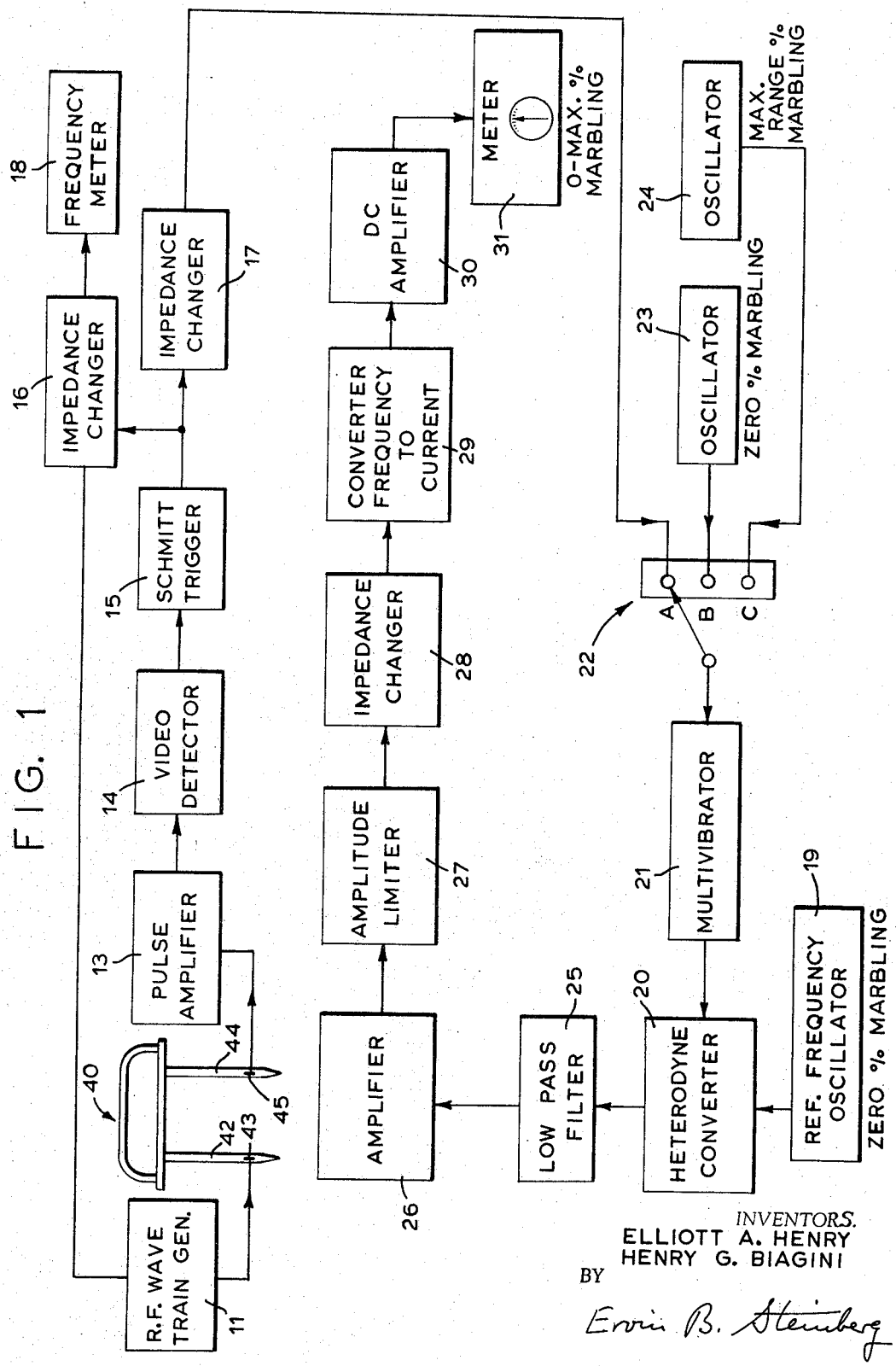

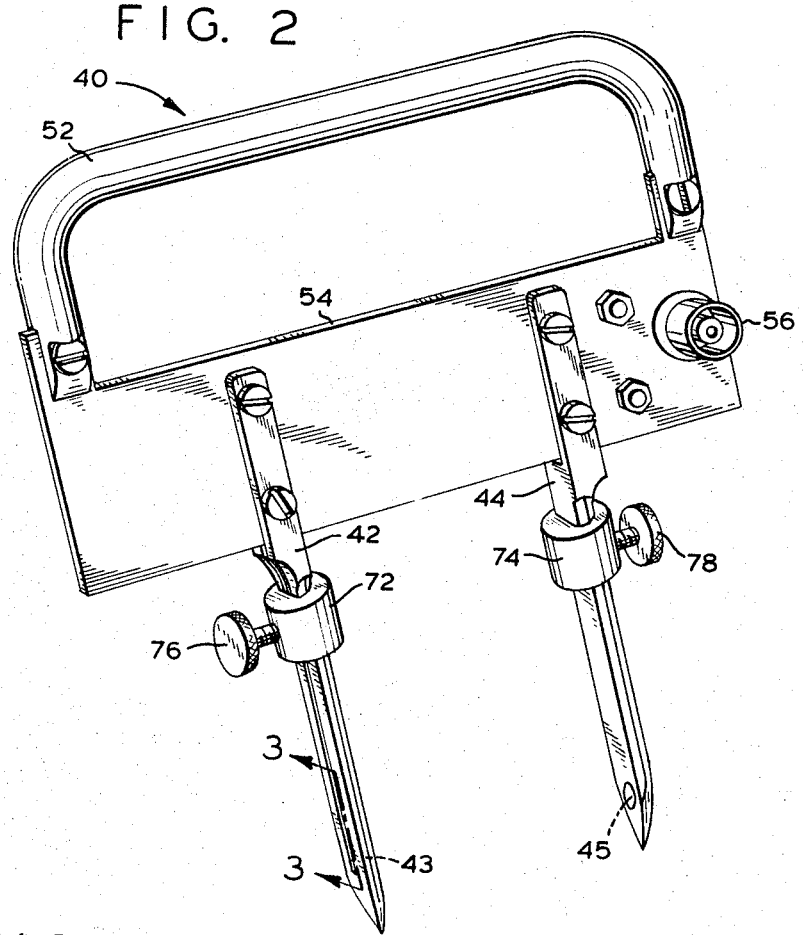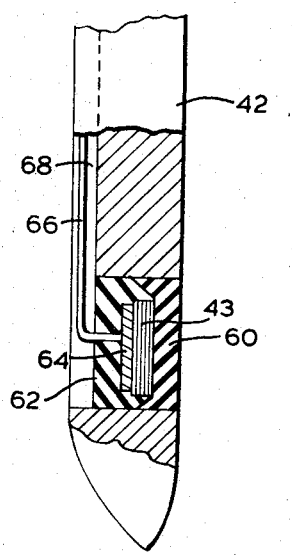

ABSTRACT OF THE DISCLOSURE

In order to determine the percentage of marbling in the muscle of a live animal, a pronged probe having ultrasonic energy transmitting and receiving means is inserted into the muscle. An electronic circuit causes an ultrasonic signal to be sent across the muscle portion demarcated by the distance between two prongs and a measuring circuit establishes the percentage of marbling responsive to the velocity of sound through the muscle portion under test.

---

This invention concerns a method and apparatus for determining by the use of sonic energy certain characteristics and inherent properties of articles and substances. More specifically, this invention has reference to a method and apparatus for assessing the constituents and quality of non-homogeneous products, such as meat, by determining the velocity of sound propagated in the particular product. Quite specifically, the instant method and apparatus concerns the measurement of marbling in the muscle of live animals.

Marbling in meat may be defined as the interspersion of fatty tissue within the muscle. The percentage of fatty tissue to muscle tissue, as is well known by those skilled in the art, is a measure of the quality of meat. The increased desire to provide meat having the desired muscle tissue to fat tissue ratio has placed an important emphasis on the determination and the measurement of marbling, particularly in live animals.

While the measurement of the thickness of the fatty outer layers in meat and live animals by ultrasonic methods is known, the measurement of the marbling characteristics in live animals has not been possible and the various methods tried have not yielded the desired result. The determination of the thickness of the outer fat layer by the ultrasonic test method is based on the fact that the interface of the fat layer with the muscle tissue provides a change in acoustic impedance and hence, using the pulse-echo acoustic measuring technique, the thickness of the outer layer is determinable and can be measured on an oscilloscope, suitably calibrated for this purpose.

The measurement of the marbling characteristics within the muscle of live animals, particularly in the longissimus dorsi, has, however, not been possible as in this case the fat tissue is layer-like interspersed within the muscle tissue.

The determination of the marbling characteristics in live animals is particularly important and of major economic significance when selecting livestock for breeding purposes.

Investigations have revealed that the transit time of ultrasonic energy through a fixed path length of muscle transverse to the direction of muscle fibers varies as a linear function of the ratio of muscle tissue to fat tissue. For example, in cattle the measured transit time across a two-inch transverse portion of the longissimus dorsi muscle with minimal marbling yields a transit time of 31.26 microseconds. The same path length of fat tissue yields a transit time of 35.61 microseconds. The difference of 4.35 microseconds, therefore, is the change from an all muscle tissue to an all fat tissue. Any value between the two limits provides a measure of the ratio of the muscle tissue to fat tissue. Assuming, for instance, a two-inch path length and a fifty percent marbling, there would be one inch of muscle tissue having a transit time of 15.63 microseconds and one inch of fat having a transit time of 17.8 microseconds. The transit time for the two inches of distance would be the sum of the two values, which is 33.43 microseconds. Likewise a twenty-five percent marbling, usually the maximum found in live animals, would comprise one and one-half inch of muscle and one-half inch of fat, providing a total transit time of 32.36 microseconds. Therefore, for a two-inch path the transit time would vary from 31.26 microseconds for no marbling to 32.36 microseconds for a twenty-five percent marbling with a linear ratio between the total transit time and the amount of marbling.

In order to take advantage of this discovery, it has been possible to design and develop a manually operable probe which is provided with two prongs for demarcating, when removably inserted into the live animal, a predetermined distance. Sonic energy transmitting and receiving means disposed in said prongs are adapted to be energized from electrical circuit means and the circuit means, in turn, provide an indication related to the transit time of the sonic energy traversing the predetermined distance. Subsequent to this determination, the probe is withdrawn from the live animal without having caused injurious damage to the animal. If the animal exhibits the desired characteristics, it is preserved for breeding purposes, while heretofore slaughtering of the animal was necessary to determine the same characteristics.

One of the objects of this invention is, therefore, the provision of a new and novel method for determining certain characteristics of meat or similar substances.

Another object of this invention is the provision of a method for determining the marbling characteristics in meat.

Another important object of this invention is the provision of a novel method and apparatus for measuring the ratio of muscle tissue to fat tissue in meat.

Still another object of this invention is the provision of a method and apparatus for ascertaining accurately and speedily the percentage of marbling in the muscle of live animals without damaging the animal and while preserving the animal for breeding purposes.

A further object of this invention is the provision of a method and apparatus for the measurement of the transit time of ultrasonic energy in the muscle of live animals, the transit time being directly related to the ratio of muscle tissue to fat tissue, which ratio is known commonly as the percentage of marbling.

A further and other object of this invention is the provision of a probe and of an electrical circuit co-operating with one another in such a manner that when the probe is inserted into the muscle of a live animal, the circuit will provide a measure of the marbling.

Still other and further objects of this invention will be more clearly apparent by reference to the following description when taken in conjunction with accompanying drawings in which:

FIGURE 1 is a block diagram of the entire measuring apparatus;

FIGURE 2 is a view of the manually operable probe, and

FIGURE 3 is a sectional view along lines 3—3 in FIGURE 2.

General considerations

Before proceeding with the detailed description of the apparatus, it will be advisable to consider the general design considerations on which the present measuring method and apparatus are based. Basically, the apparatus comprises a probe having, in a typical embodiment, two prongs spaced two inches apart. This probe is inserted into the muscle of a live animal and sonic energy is passed between the prongs through the muscle across the distance demarcated by the prongs. An electronic circuit coupled to the probe controls the application of sonic energy and provides a measurement of sound propagation, particularly of the transit time across the predetermined distance. The electronic circuit is of the re-entrant type, that is, the passing of a sonic pulse through the muscle initiates the propagation of a succeeding pulse. Thus, the pulse repetition frequency is a direct measure of transit time.

To cite some examples, the following transit time of ultrasonic pulses (2.0 megacycles per second) in tissue of live animals across a two-inch path, one way, has been measured.

|  | Cattle | Swine | Lamb |
| --- | --- | --- | --- |
|  | Values in Microseconds of Time (t) | | |
| Fat | 35.61 | 34.62 | 35.0 |
| Muscle | 31.26 | 31.13 | 31.7 |
| $\Delta t$ | 4.35 | 3.49 | 3.30 |

The measured fixed error (delay time) of the probe having prongs with a two-inch spacing and the associated circuit was measured to be 1.2 microseconds.

The corrected transit time, subtracting 1.2 microseconds from the above values, and calculating a twenty-five percent marbling (one-quarter of the $\Delta t$), provides the following table:

|  | Cattle | Swine | Lamb |
| --- | --- | --- | --- |
|  | Values in Microseconds of Time (t) | | |
| No Marbling | 32.46 | 32.33 | 32.90 |
| 25% Marbling | 33.56 | 33.20 | 33.72 |
| $\Delta t$ | 1.1 | 0.87 | 0.82 |

The pulse repetition frequency, being the reciprocal of transit time, is then as follows:

|  | Cattle | Swine | Lamb |
| --- | --- | --- | --- |
| No Marbling (kcs.) | 30.73 | 30.99 | 30.40 |
| 25% Marbling (kcs.) | 29.72 | 30.12 | 29.62 |
| $\Delta F$ (c.p.s.) | 1,010 | 870 | 780 |

Hence, it will be apparent that the frequency differential ($\Delta F$) is directly proportional to the percentage of marbling in the muscle of the particular animal. To establish the overall marbling characteristics, measurements at different locations are made and the total evaluated.

*Calibration considerations*

As noted above, the probe and associated circuit is afflicted with an inherent delay time which must be subtracted from the transit time of the sonic pulse through the muscle. The probe calibration is accomplished when it is connected to its associated electrical circuit. The reference medium for calibration is distilled water at 31 degrees centigrade. Distilled water at that temperature has a sound transmitting velocity of 1505 meters per second which equals 59,256 inches per second, or 0.059265 inch per microsecond. The propagation time, therefore, is 16.87 microseconds per inch, or 33.74 microseconds for the two-inch spacing of the prongs indicated above. If there were no delay time in the circuit and probe, the pulse repetition frequency would be 1,000,000/33.74 or 29,638 cycles per second. However, due to the delay time of the circuit and probe, the indicated frequency for the two-inch water path will be lower than the 29,638 cycles per second. The delay time is then subtracted from the measured time (reciprocal of the pulse repetition rate) to obtain the true transit time for the two-inch path of muscle or fat. Therefore, the delay time of the circuit and probe is determined most suitably by adjusting the probe for exactly two inches of spacing between the prongs and inserting it in distilled water at 31 degrees centigrade and converting the indicated pulse repetition rate to transit time by taking the reciprocal of the indicated pulse repetition rate. Next, 33.74 microseconds is subtracted from the reciprocal of the indicated repetition rate and the remainder is the delay time in microseconds, which in the typical example was measured to be 1.2 microseconds.

Therefore, for each operational measurement the delay time must be subtracted from the reciprocal of the pulse repetition rate in order to provide a measure of the true transit time for the respective two-inch path. As will be seen, circuit means can be employed to compensate for the inherent delay time of the probe and circuit to produce at all times an indication of the true transit time.

*System description*

Referring now to the figures and FIGURE 1 in particular, numeral 11 refers to an R-F wave train generator which, in this instance, comprises a free-running blocking oscillator having a very low, approximately 60–100 pulses per second, repetition frequency. The normal unidirectional pulse output of the blocking oscillator is transformed into an alternating wave pulse, or wave train, in a series resonance circuit comprising an inductance and the electrostatic capacity of the transducer element 43, the latter forming a part of the probe 40 which is adapted to be inserted into the muscle. The probe comprises two prongs 42 and 44, each of which contains a respective piezoelectric transducer element, 43 and 45, mounted securely a fixed distance apart, for example, 2 inches. The opposing transducer faces are parallel and when there is a medium between the two elements capable of transmitting ultrasound, the ultrasonic wave train generated by element 43 (when driven by the R-F wave train from the pulse generator 11) is launched into the sound conducting medium, for example, the muscle of a live animal. At a later time, depending upon the velocity constant within the sound conducting medium, the sonic energy arrives at the element 45 where the acoustic wave train is converted by the piezoelectric action into an electrical wave train. This delayed wave train has a relatively low amplitude and is amplified in a carrier pulse amplifier 13, such amplifiers being well known and are generally characterized by having a center frequency equal to the frequency of the wave train and a band width not less than the reciprocal of the pulse duration. The R-F pulse which has been amplified in the carrier pulse amplifier 13, is coupled to a video detector circuit 14 where the R-F pulse is transformed into a video or unidirectional pulse. The video pulse is further shaped in a Schmitt trigger circuit 15, having the characteristics of producing a constant amplitude unidirectional pulse output for signals whose amplitude exceeds a predetermined value. The shaped and amplitude controlled pulse is now coupled to two impedance changing devices 16 and 17. These devices are normally emitter followers in transistor circuitry, or cathode followers in electron tube circuitry. The purpose of these impedance changing circuits is to transform the output signals from the Schmitt circuit 15, which normally are at a high impedance, to a lower impedance suitable for driving capacitative or other low impedance loads. The purpose of the two impedance changing devices is to reduce the possibility of common coupling between the subsequent output circuits. The output of the impedance changing circuit 16 is coupled to two circuits represented as block 18, preferably a digital frequency meter, and to block 11, the blocking oscillator pulse generator. The action in this loop may be described as follows: The free running feature of oscillator 11 may be considered as a keep-alive circuit whose function is to always have suitable excitation to the transmitting element 43 whenever acoustic coupling exists between the transducer 43 and 45, so that the delayed wave train after passage through the sound conducting medium, processing and shaping is returned to the blocking oscillator pulse generator 11 to activate it, which in turn activates the transducer 43. This transducer, then, launches another ultrasonic wave into the sound conducting medium, and so forth. In other words, the pulse repetition frequency, which is a function of the acoustic transit time between transducer elements 43 and 45, and the recurrence becomes self-sustaining. The recurrence of pulse repetition frequency can be read directly on the digital frequency meter 18.

The foregoing, with block 17 deleted, is a complete system for measuring the degree of marbling within the muscles of live animals. However, the transit time based on the reciprocal of the repetition frequency, read from the digital frequency meter, contains an error. This error is the fixed error, as discussed previously, and results from the inherent delays of the electronic and ultrasonic elements of the system. The fixed error in terms of time delay of such systems is equal to the reciprocal of the pulse repetition frequency if there were zero time delay between the two crystals 43 and 45 of the probe 40 and in the electronic circuit. As described hereinabove, for the typical circuitry used, this fixed error transit time has been found to be 1.2 microseconds. The additional circuit shown in this figure has two functions, first, it provides a method of a direct read-out in terms of percentage of marbling within the muscle, compensating for the fixed error and computation required when the read-out is on the digital frequency meter; and second, it provides a method of calibrating the direct read-out in terms of percentage of marbling for any type of animal and for any maximum and minimum degree of marbling. This additional circuitry will now be described.

The output signals from the Schmitt trigger 15 occur at the pulse repetition frequency and are of relatively short duration, being in the order of 5 to 10 microseconds normally. These signals are at a relatively high impedance level and are transformed to a low impedance in impedance changer 17, comprising a cathode follower in an electron tube arrangement and an emitter follower when transistors are used. The output signals from block 17 are coupled to position A of a three-position switch 22. Position A is the "operate" position. Position B is coupled to a low range reference frequency oscillator 23, which will be described later, and position C is connected to a high range reference frequency oscillator 24. A heterodyne converter 20 is employed in this portion of the circuitry to produce an output which is essentially only the difference frequency between the maximum and the minimum frequencies corresponding to zero and twenty-five percent marbling, including the fixed error of the system. The short duration triggers from impedance changer 17 are not basically suited to be coupled to the heterodyne converter and heterodyned against essentially sinusoidal shaped reference signals, such as are produced by the reference frequency oscillator 19. Therefore, a multivibrator 21 is inserted to convert the short duration pulse triggers to essentially a square wave, having the same fundamental frequency as the pulse repetition frequency and a constant amplitude. Block 21 is most conveniently an astable multivibrator having a free-running frequency which is lower than the lowest repetition frequency expected, but synchronized to the repetition frequency by the pulse signals from the impedance changer 17. Thus, multivibrator 21 essentially converts the unidirectional pulses from the trigger 15 and the impedance changing device 17 into a form more suitable to operate the heterodyne converter 20, but retaining the pulse repetition frequency information. The output from multivibrator 21 is coupled to one input of the heterodyne converter 20, while the other input to the heterodyne converter is a standard frequency, preferably from a crystal controlled oscillator 19, whose frequency is equal to the repetition frequency generated by the system for zero marbling. The difference frequency output from the heterodyne converter 20 is coupled to the low-pass filter 25 to remove any residual R-F component which may have passed through the converter 20. For animals such as cattle, swine, and lamb, and where a two-inch path length is used between the transducer elements 43 and 45, the difference frequency will range between zero and 1200 cycles per second for the range of zero to 25 percent marbling. The difference frequency is amplified in amplifier 26, comprising essentially a low frequency amplifier. The amplified difference frequency is amplitude limited in the amplitude limiter 27, consisting essentially of a diode limiter circuit, clamped to a suitable potential, and then transformed to a low impedance in the emitter follower amplifier 28. The output of the emitter follower 28 is coupled to block 29, a frequency-to-current converter. The current, proportional to frequency, generated by this circuit is coupled to a direct current amplifier 30, the gain of which may be controlled by the operator. The output of the current amplifier 30 is then coupled to an indicating meter 31 which preferably is of the moving coil type. This meter is calibrated between zero and 25 percent marbling so that the operator may read directly the percentage of marbling without reference to the fixed error of the system.

*System calibration*

In the preferred embodiment of this invention, fixed frequency oscillators 19, 23, and 24 represent crystal controlled oscillators, and are constructed as plug-in assemblies to accommodate the instrument to testing various kinds of animals, and for varying degrees of expected maximum marbling. When switch 22 is placed in position B so that oscillators 23 and 19 are coupled to the inputs of heterodyne converter 20, the output of the converter will be zero frequency as oscillators 23 and 19 always are the same frequency. The frequency of these two oscillators is determined by the equivalent frequency, including the fixed error, of the zero percent marbling condition. This permits the zero position on the meter 31 to be set to zero percent marbling. When the switch 22 is placed in position C, then oscillator 24, representing a crystal controlled oscillator whose frequency is equal to 25 percent marbling (or any other figure determined by the operator), is heterodyned against the frequency of oscillator 19 and the output frequency from the heterodyned converter corresponds to this maximum marbling condition (either 25 percent or some other chosen value), and the gain of the direct current amplifier 30 is adjusted so that the meter at full scale reads 25 percent marbling, or any other degree which has been determined to be desirable. By these means the desired marbling range can always be spread over the full scale range of the meter, yielding the maximum readability accuracy. A further advantage of the crystal controlled calibration standards is that the operator may instantly check both the low and high range at any time and that these crystal controlled standards, which can be made to be extremely precise, permitting all instruments to read alike. In other words, the instrument may be calibrated in absolute terms and not based upon empirical tests of unknown animals.

*Probe construction:*

FIGURES 2 and 3 reveal the general construction of the probe 40. A hand grip 52 is fastened to a transverse plate 54 from which a pair of fixedly spaced, parallel metal prongs 42 and 44 extend. The prongs are secured to the plate by suitable fastening means. Each of the prongs near its knife-type free end is provided with a respective small piezoelectric transducer 43 and 45, which is connected to a respective electrical cable connector 56, only one being visible in FIGURE 2.

The respective piezoelectric transducer, as best seen in FIGURE 3, is disposed in a recess of the prong, the front face of the material being covered with an electrically conductive epoxy resin 60, and the rear face of the piezoelectric material being covered with a sound absorbing electrically insulating resin 62. An electrically conductive layer 64 attached to the rear face of the piezoelectric material is connected to an electrical conductor 66, which is routed along the longitudinal slot 68 toward the plate 54 for termination at the respective electrical connector (not shown). The electrical connection to the front face of the transducer is accomplished by the resin 60 and its conductive relation with the prong 42. In order to limit the insertion of the prongs to a predetermined depth, there is provided a set of bushings 72 and 74, each slidably adjustable along its respective prong by means of screws 76 and 78. If desired, the live animal may be anesthetized locally immediately preceding the insertion of the prongs.

As shown, each of the prongs includes a respective ultrasonic transducer, but it will be apparent to those skilled in the art, that one transducer can serve readily as the transmitter, as well as the receiver of ultrasonic energy, a method well known in the art of ultrasonic pulse-reflection test. In this case, the opposite prong serves as a reflector for the transmitted sonic pulse and the distance travelled by the sonic energy through the muscle equals twice the prong spacing. The electrical circuit modification includes a gated amplifier in order to maintain the sequence and to differentiate between transmitted and received pulse signals.

While there has been described and illustrated a preferred method and apparatus of this invention and certain modifications thereof, it will be apparent to those skilled in the art that various other and further changes and modifications may be made therein without deviating from the broad principle and intent of this invention, which shall be limited only by the scope of the appended claims.

What is claimed is:

1. A method for determining the percentage of marbling in a muscle of a live animal comprising the steps of:
   inserting a pair of fixedly spaced probes into the muscle of the live animal;
   propagating pulses of sonic energy through the muscle across the space spanned by said probes, and
   indicating a value commensurate with the transit time of said pulses across said space, whereby said value is a measure of the marbling.

2. A method for determining the percentage of marbling in a muscle of a live animal comprising the steps of:
   penetrating the skin of the animal with a set of fixedly spaced probes which include sonic energy transmitting and receiving means and lodging said probes in the muscle;
   propagating sonic energy pulse signals between said transmitting and receiving means, and
   visually displaying a value commensurate with the transit time of said pulse signals between said transmitting and receiving means whereby said value is indicative of the percentage of marbling.

3. A method for determining the percentage of marbling in a muscle of a live animal comprising the steps of:
   inserting a probe having sonic energy transmitting and receiving means into the muscle of the animal substantially transverse to the direction of the muscle fibers;
   propagating sonic energy between said transmitting and receiving means; and
   indicating a value commensurate with the transit time of said energy between said transmitting and receiving means, whereby said value is related to the percentage of marbling.

4. A method for determining the percentage of marbling in the muscle of a live animal comprising the steps of:
   inserting sonic energy transmitting and receiving means into the muscle of an animal by penetrating the hide of the animal and disposing the transmitting and receiving means in the muscle portion of the live animal;
   propagating sonic energy between said transmitting and receiving means, and
   indicating a value commensurate with the transit time of said energy between said transmitting and receiving means whereby said value is related to the percentage of marbling in the muscle of the animal at the respective location.

5. A method for determining the percentage of marbling in the muscle of a live animal comprising the steps of:
   selecting a desired test area;
   anesthetizing the selected area;
   inserting spaced sonic energy transmitting and receiving means through the hide of the animal into the test area;
   propagating pulses of sonic energy between said transmitting and receiving means;
   indicating a value commensurate with the transit time of said pulses between said transmitting and receiving means whereby said value is related to the percentage of marbling; and
   subsequently withdrawing said energy transmitting and receiving means.

6. An apparatus for determining the percentage of marbling in a muscle of a live animal comprising:
   a probe having a pair of spaced prongs for insertion into the muscle of the live animal to demarcate a predetermined distance within the muscle;
   sonic energy transmitting and sonic energy receiving means disposed in respective prongs;
   an electrical pulse generator adapted to provide electrical pulses coupled to said transmitting means whereby in response to each electrical pulse a sonic signal is propagated toward said receiving means;
   electrical circuit means coupled to said receiving means, said circuit means comprising the series connection of a pulse amplifier, a video detector, a trigger circuit for providing constant amplitude unidirectional pulses, a first impedance changing means, and a digital frequency meter;
   circuit means for providing a connection between said impedance changing means and said electrical pulse generator for causing said pulse generator to provide a succeeding pulse signal responsive to the receipt of a signal by said electrical circuit means;
   whereby said frequency meter indicates a value responsive to the pulse repetition frequency of said pulse generator, said frequency being a measure of the marbling of the muscle in the live animal, and
   a further electrical circuit coupled for indicating the percentage of marbling, said further electrical circuit including a second impedance changing means coupled to said trigger circuit for receiving a signal therefrom and providing a signal to a multivibrator coupled thereto, a heterodyne converter coupled for receiving a first signal from said multivibrator and a second signal from a radio frequency oscillator operating at a frequency representing substantially zero percent marbling, said heterodyne converter adapted to provide an output signal responsive to the difference frequency between said first and said second signals, said output signal being coupled to the series connection of a low pass filter, an amplifier, a signal amplitude limiter, a third impedance changing means, a frequency-to-current converter, a direct current amplifier and to an indicating meter calibrated in percent marbling.

7. An apparatus as set forth in claim 6 wherein said pulse generator provides electrical pulses at a frequency which causes said sonic signal to be in the ultrasonic frequency range.

References Cited

UNITED STATES PATENTS

| | | | |
|---|---|---|---|
| 2,889,705 | 6/1959 | Hanysz | 73—67.5 X |
| 3,009,104 | 11/1961 | Brown | 73—67.5 X |
| 3,040,562 | 6/1962 | Fitzgerald et al. | 73—67.8 X |
| 3,062,059 | 11/1962 | Singleton | 73—517 |
| 3,066,525 | 12/1962 | Harris | 73—67.5 X |
| 3,165,923 | 1/1965 | Lund | 73—67.8 |
| 3,184,959 | 5/1965 | Sullentrop | 73—67.6 X |
| 3,269,173 | 8/1966 | Ardenne | 73—67.9 |

FOREIGN PATENTS

| | | |
|---|---|---|
| 968,465 | 9/1964 | Great Britain. |

OTHER REFERENCES

An article entitled, "A Sonic Technique for Testing Leather" from the National Bureau of Standards Bulletin, March 1956, pages 35–7.

An article entitled, "Sing-Around Ultrasonic Velocimeter for Liquids" from The Review of Scientific Instruments, November 1957, pages 897–901.

JAMES J. GILL, *Primary Examiner.*

RICHARD C. QUEISSER, *Examiner.*